US008980092B2

(12) United States Patent
Kistner et al.

(10) Patent No.: US 8,980,092 B2
(45) Date of Patent: Mar. 17, 2015

(54) SEPTIC SYSTEM

(71) Applicants: Kenneth J. Kistner, Midlothian, TX (US); Carolyn R. Kistner, Midlothian, TX (US)

(72) Inventors: Kenneth J. Kistner, Midlothian, TX (US); Carolyn R. Kistner, Midlothian, TX (US)

( * ) Notice: Subject to any disclaimer, the term of this patent is extended or adjusted under 35 U.S.C. 154(b) by 0 days.

(21) Appl. No.: 14/101,732

(22) Filed: Dec. 10, 2013

(65) Prior Publication Data

US 2014/0097138 A1 Apr. 10, 2014

Related U.S. Application Data

(60) Continuation-in-part of application No. 13/646,818, filed on Oct. 8, 2012, now Pat. No. 8,603,338, which is a division of application No. 13/364,033, filed on Feb. 1, 2012, now Pat. No. 8,282,817, and a continuation-in-part of application No. 13/083,986, filed on Apr. 11, 2011, now Pat. No. 8,110,096.

(60) Provisional application No. 61/323,958, filed on Apr. 14, 2010.

(51) Int. Cl.
*C02F 3/00* (2006.01)
*C02F 3/34* (2006.01)
*C02F 3/12* (2006.01)

(52) U.S. Cl.
CPC .............. *C02F 3/342* (2013.01); *C02F 3/1242* (2013.01); *C02F 3/348* (2013.01); *C02F 2209/40* (2013.01)
USPC ........... 210/620; 210/621; 210/739; 210/745; 210/150; 210/151; 210/194; 210/220; 210/241

(58) Field of Classification Search
USPC ......... 210/620, 621, 739, 745, 150–151, 194, 210/220, 241
See application file for complete search history.

(56) References Cited

U.S. PATENT DOCUMENTS

| 3,477,947 A | * | 11/1969 | Kappe | 210/621 |
| 3,680,704 A | | 8/1972 | Schaefer | |
| 3,799,346 A | | 3/1974 | Freese | |
| 4,053,394 A | * | 10/1977 | Fisk | 210/605 |
| 4,070,292 A | | 1/1978 | Adams | |
| 4,104,166 A | | 8/1978 | LaRaus | |
| 5,004,159 A | | 4/1991 | Kistner | |
| 5,005,765 A | | 4/1991 | Kistner | |
| 5,520,888 A | | 5/1996 | Berndt | |
| 5,891,330 A | | 4/1999 | Morris | |
| 5,905,037 A | | 5/1999 | Cooney | |
| 6,106,703 A | | 8/2000 | Nassef | |
| 6,652,743 B2 | | 11/2003 | Wallace | |
| 6,984,325 B1 | | 1/2006 | Venable | |
| 6,991,192 B2 | * | 1/2006 | Phillips et al. | 241/46.01 |
| 2003/0164329 A1 | | 9/2003 | Young | |
| 2006/0043017 A1 | | 3/2006 | Cooley | |
| 2007/0090030 A1 | * | 4/2007 | Teran et al. | 210/86 |
| 2008/0173581 A1 | * | 7/2008 | Maclean | 210/620 |
| 2013/0126440 A1 | * | 5/2013 | Prause et al. | 210/743 |

* cited by examiner

*Primary Examiner* — Chester Barry
(74) *Attorney, Agent, or Firm* — James E. Walton

(57) ABSTRACT

A system and method includes an aeration subsystem that excites enzymes in the liquid waste passing through the septic system. The aeration subsystem includes a compressor section that compresses the liquid waste. The method includes mixing enzymes into the fluid waste material, compressing the fluid waste material with the compressor, injecting air into the compressed fluid waste material, and determining whether the fluid waste material is at a desired cleanliness, and if not, recirculating the fluid waste material through the compressor.

5 Claims, 9 Drawing Sheets

SEPTIC SYSTEM

CROSS-REFERENCE TO RELATED APPLICATIONS

This application is a Continuation-in-part of Ser. No. 13/646,818 filed on Oct. 8, 2012, now U.S. Pat. No. 8,603,338, which is both a division of Ser. No. 13/364,033 filed on Feb. 1, 2012, now U.S. Pat. No. 8,282,817, and also a Continuation-in-part of Ser. No. 13/083,986 filed on Apr. 11, 2011, now U.S. Pat. No. 8,110,096, the latter of which claims the benefit of provisional application 61/323,958, filed on Apr. 14, 2010.

BACKGROUND

1. Field of the Invention

The present application relates generally to fluid systems and, more particularly, to septic systems.

2. Description of Related Art

Septic systems are well known in the art for disposing waste material found in gray water, black water, sewage, and the like and are typically used in rural residential areas where city sewage systems are unavailable. Septic systems include one or more tanks for storing and treating liquid waste. After treatment, the effluent is leached from the septic system and deposited in the soil surrounding the septic system. Under ideal conditions the septic systems effectively remove odors, waste material, and harmful bacteria from the liquid waste. It should be understood that the effectiveness of the process varies considerably upon different factors, including the capacity of the system in relation to the number of persons utilizing the facilities serviced by the septic tank and the type of waste matter entering into the septic system.

Enzymes and/or other organisms are typically added to the liquid waste, which in turn effectively disposes of the waste material. Commercial enzymes, such as RID-EX, effectively decompose the waste matter in the liquid waste. It should be understood that merely adding enzymes will not result in the full decomposition of the waste material. For example, some enzymes have the tendency to settle to the bottom of the tank, never reaching the floating waste material. In addition, some septic systems do not provide sufficient time for the enzymes to dispose of the waste material.

Although great strides have been made in septic systems, considerable shortcomings remain.

DESCRIPTION OF THE DRAWINGS

The novel features believed characteristic of the invention are set forth in the appended claims. However, the invention itself, as well as a preferred mode of use, and further objectives and advantages thereof, will best be understood by reference to the following detailed description when read in conjunction with the accompanying drawings, wherein:

Figure 1:
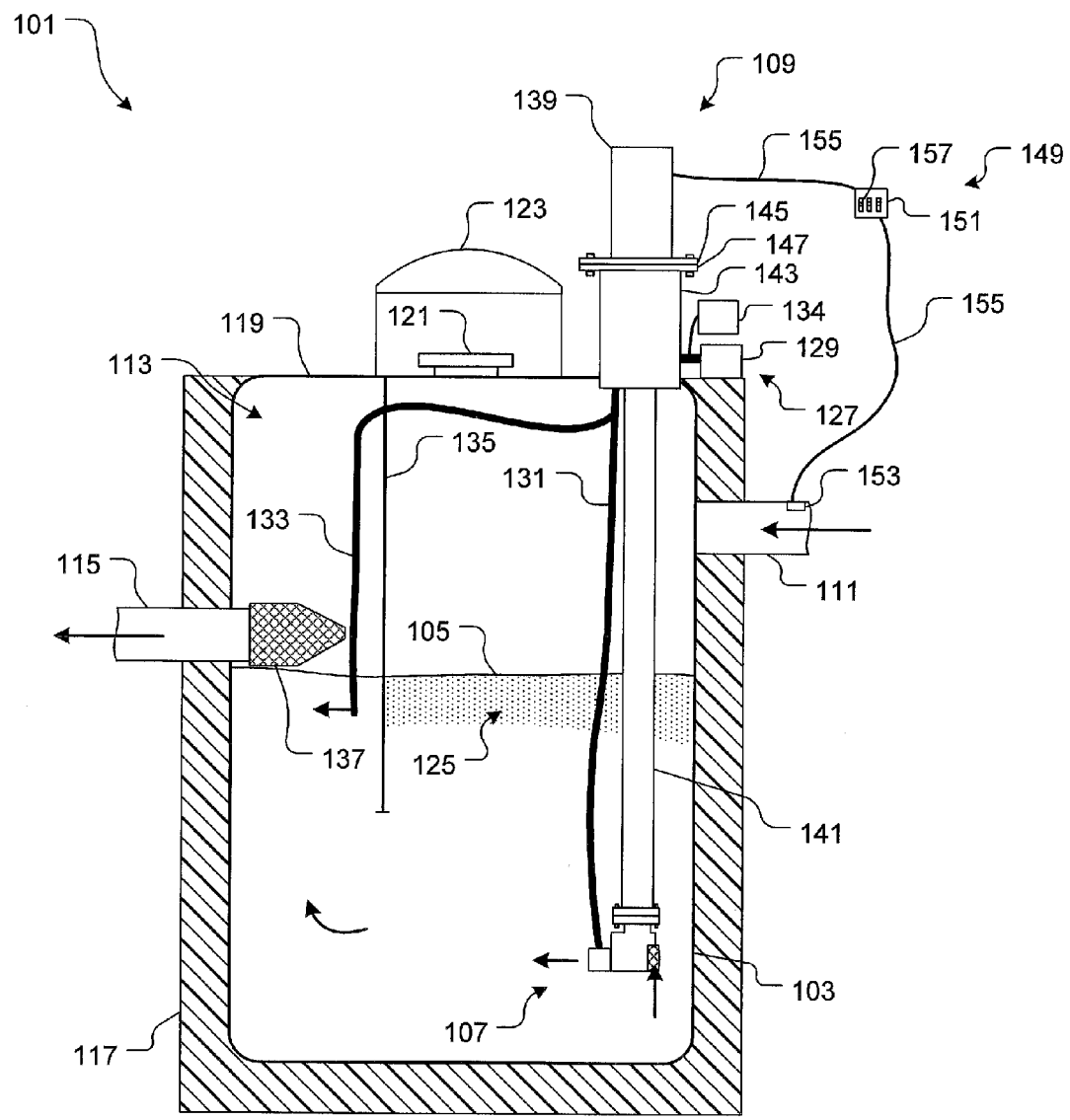
FIG. 1 is a side view of a septic system according to the preferred embodiment of the present application.

While the system and method of the present application is susceptible to various modifications and alternative forms, specific embodiments thereof have been shown by way of example in the drawings and are herein described in detail. It should be understood, however, that the description herein of specific embodiments is not intended to limit the invention to the particular embodiment disclosed, but on the contrary, the intention is to cover all modifications, equivalents, and alternatives falling within the spirit and scope of the process of the present application as defined by the appended claims.

DETAILED DESCRIPTION OF THE PREFERRED EMBODIMENT

Illustrative embodiments of the system and method are provided below. It will of course be appreciated that in the development of any actual embodiment, numerous implementation-specific decisions will be made to achieve the developer's specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

The septic system of the present application overcomes common disadvantages associated with conventional septic systems. The septic system of the present application comprises one or more aeration subsystems adapted for exciting enzymes added to the liquid waste. The aeration subsystem greatly reduces waste material by the process of breaking apart the molecular bonds of the enzymes, and then, injecting oxygen into the liquid waste material. The dual process results in an enzyme feeding frenzy.

The septic system of the present application will be understood, both as to its structure and operation, from the accompanying drawings, taken in conjunction with the accompanying description. Several embodiments of the septic system are presented herein. It should be understood that various components, parts, and features of the different embodiments may be combined together and/or interchanged with one another, all of which are within the scope of the present application, even though not all variations and particular embodiments may be specifically illustrated in the drawings.

Referring now to FIG. 1 in the drawings, a side view of septic system 101 according to the preferred embodiment is shown. Septic system 101 is utilized to store, treat, and dispose of liquid waste such as gray water, black water, and sewage from a residential building. However, it should be appreciated that the features of septic system 101 could easily be incorporated in any application for disposing of liquid waste, i.e., a cattle pond wherein cow manure is frequently deposited, feed lots, portable waste systems for disposing of pet waste material, and/or waste systems. It will be appreciated that the features of septic system 101 could easily be adapted to retrofit existing septic systems.

Septic system 101 comprises one or more of a tank 103 adapted to store and treat liquid waste 105 entering from a residential building (not shown), an aeration subsystem 107 being positioned in tank 103 for providing oxygen to liquid waste 105 disposed therein, and a driver subsystem 109 for driving aeration subsystem 107.

Septic system 101 is preferably a gravity pulled system, wherein liquid waste 105 travels through system 101 via the earth's gravitational pull. Thus, in the preferred embodiment, tank 103 is positioned underground, below the residential fluid reservoirs, i.e., the household sink, dishwasher, shower, toilet, and the like. The household fluid reservoirs are in fluid communication with conduit 111, which is adapted for channeling liquid waste 105 to a cavity 113. Liquid waste 105 enters cavity 113 via conduit 111 and exits via a conduit 115. While in cavity 113, liquid waste 105 is stored and preferably treated with enzymes or other similar types of organisms or material adapted to dispose of waste material. Liquid waste 105 eventually exits cavity 113 via conduit 115 when a predetermined fluid capacity in tank 103 is reached. Thereafter, effluent is leached to an area surrounding septic system 101, i.e., to the lawn. It should be appreciated that alternative embodiments of septic system 101 could include tank 103 positioned aboveground in lieu of the preferred embodiment; however, this type of embodiment would likely require additional driver subsystems, i.e., pumps, for channeling the waste water through the septic system. In addition, it will be appreciated that system 101 could be adapted as a portable system. For example, in an alternative embodiment, system 101 could be adapted to mounting on a truck and/or other mobile apparatus, thus allowing system 101 to effectively dispose of waste in multiple locations.

Tank 103 is preferably a 275 gallon tank manufactured with an impermeable material, i.e., plastic, that allows sunlight or other forms of light to travel therethrough. It has been discovered that sunlight further increases the effectiveness of the treatment process due to sunlight exciting the enzymes, which in turn causes the enzymes to effectively decompose the waste material. Tank 103 is preferable supported underground with a concrete material 117 approximately 3 inches thick. Material 117 is used to support the bottom and sides of tank 103. A top surface 119 of tank 103 remains exposed to receive sunlight. Of course, it should be appreciated that alternative embodiments could include septic tanks having different storage capacities, composed of different materials, and supported with different types of support structures in lieu of the preferred embodiment. For example, a septic system for a commercial or industrial application would require a larger tank and could be supported with a metal support structure in lieu of the preferred embodiment. In addition, an alternative embodiment could include septic tanks manufactured with fiberglass, metal, and/or other suitable materials in lieu of the preferred embodiment.

Tank 103 is further provided with a lid 121 that enables a user to access cavity 113. For example, a user can open lid 121 to visually inspect aeration subsystem 107 or add additional enzymes to liquid waste 105. An optional sun bonnet 123 is provided and placed over lid 121. Sun bonnet 123 serves to protect lid 121 and increases the aesthetic appearance of the septic system. Sun bonnet 123 is preferably composed of a transparent or translucent material, i.e., a form of plastic material, which allows sunlight to pass therethrough. FIG. 1 illustrates bonnet 123 covering lid 121 and a small surrounding area; however, it should be appreciated that bonnet 123 could be adapted to cover the entire top surface area 119.

Aeration subsystem 107 is preferably utilized to excite enzymes in waste water 105 and, thereafter, providing oxygen to the enzymes. This process has been shown to cause a feeding frenzy between the enzymes and the waste material. It should be appreciated that alternative embodiments of aeration subsystem 107 could include a less sophisticated subsystem by merely injecting oxygen into liquid waste 105 in lieu of preferred process. It will be appreciated that oxygenation systems adapted to provide merely oxygen, could be utilized in lieu of or in addition to aeration subsystem 107 in alternative embodiments.

Aeration subsystem 107 is adapted to circulate liquid waste 105 in cavity 113 such that the enzymes are constantly being circulated from aeration subsystem 107 to the waste material 125 floating on the surface of liquid waste 105. In the preferred embodiment, aeration subsystem 107 is positioned at a depth below waste material 125. It should be understood that waste material 125 is typically less dense than liquid waste 105, thus having a tendency to float near the surface of liquid waste 105. Placing aeration subsystem 107 below waste material 125 increases the overall effectiveness of circulating liquid waste 105 due to less waste material 125 clogging the components of aeration subsystem 107. It should be appreciated that alternative embodiments could include an aeration subsystem adapted for receiving waste material 125, i.e., a subsystem that shreds waste material 125 into smaller pieces while also providing oxygen to the liquid waste (see FIG. 6). The particular features of aeration subsystem 107 are further illustrated and discussed in below with reference to FIGS. 3-5.

Septic system 101 further comprises an air subsystem 127 in gas communication with aeration subsystem 107. Air subsystem 127 includes an air pump 129 adapted to channel air through tubing 131 and tubing 133. Tubing 131 channels air to aeration subsystem 107, while tubing 133 channels air to liquid waste 105 near conduit 115. Tubing 131 and tubing 133 are preferably composed of a metal material, i.e., copper tubing; however, it should be appreciated that alternative embodiments could include other types of tubing such as rubber tubing in lieu of the preferred embodiment.

In the preferred embodiment, air subsystem 127 is further provided a container 134 for storing enzymes. Container 134 is in fluid communication with conduit 133 and is adapted for providing a determined amount of enzymes in the stream of air channeled through conduit 133.

An optional baffle 135 is utilized for separating waste material 125 from conduit 115. FIG. 1 illustrates baffle 135 attached to the top interior surface of cavity 113 and extending to a position in liquid waste 105 below the depth of waste material 125. Baffle 135 could be composed of a permeable material such as a perforated plate for allowing liquid waste 105 to pass therethrough. In the preferred embodiment, tubing 133 is positioned near the entrance of conduit 115 and has one or more ports (not shown) for providing air passage. The pressurized air leaving tubing 133 moves any waste material 125 away from the entrance of conduit 115. The entrance of conduit 115 is covered with an optional screen 137 for keeping waste material 125 from entering into conduit 115. The combination of providing a baffle, a conduit with pressurized air, and a screen effectively reduces the amount of waste material 125 entering in conduit 115.

Driver subsystem 109 preferably comprises one or more of a motor 139, a shaft 313 (see FIG. 3), and a mast 141. Motor 139 is adapted to rest securely on a cylindrical sleeve 143. Sleeve 143 extends through top surface 119 and provides access to cavity 113. In the preferred embodiment, sleeve 143 is sufficiently sized such that a user can conveniently remove mast 141 and aeration subsystem 107 through sleeve 143. This accommodates situations when the aeration subsystem needs to be removed from cavity 113, i.e., for maintenance.

Motor 139 is attached to a flange 145, which in turn couples to a flange 147 attached to sleeve 143. When assembled, flange 145 rests on flange 147 and is secured with one or more bolts. Flange 145 and flange 147 create a fluid seal such that liquid waste 105 cannot escape cavity 113 through sleeve 143. In the preferred embodiment, air subsystem 129 also utilizes sleeve 143 for allowing tubing 131 and tubing 133 access to cavity 113. It should be appreciated that alternative embodiments could include passages through surface 119 and/or lid 121 for allowing tubing 131 and tubing 133 access to cavity 113.

In the preferred embodiment, driver subsystem 109 utilizes an electric motor conductively coupled to an electrical power source (not shown); however, it should be appreciated that alternative embodiments could include different devices to drive driver subsystem 109. For example, in rural areas where electrical means are limited, a bike can be modified to drive aeration subsystem 107. In this embodiment, the back wheel of the stationary bike can be modified to rotate a flywheel or similar device for driving aeration subsystem 107.

Septic system 101 is further provided with an optional control subsystem 149 comprising one or more of a control box 151, a sensor 153, and two conductors 155. Conductors 155 are conductively coupled between control box 151, motor 139, and sensor 153. In the preferred embodiment, sensor 153 is positioned in conduit 111 and adapted for detecting the flow of liquid waste 105 channeled therethrough. Upon sensing the flow of liquid waste 105, sensor 153 relays a signal to control box 151, which in turn activates motor 139 that drives aeration subsystem 107 for a predetermined time. It should be appreciated that control box 151 comprises circuitry, microprocessors, memory devices, sensors, switches, and other electronic components necessary to run and operate aeration subsystem 107. In addition, it should be appreciated that control box 151 can be manually controlled via a switch 157 designated to activate and deactivate driver subsystem 109. Alternative embodiments could also include a sensor being positioned at different locations, i.e., within cavity 113, in lieu of the preferred embodiment.

Figure 2:
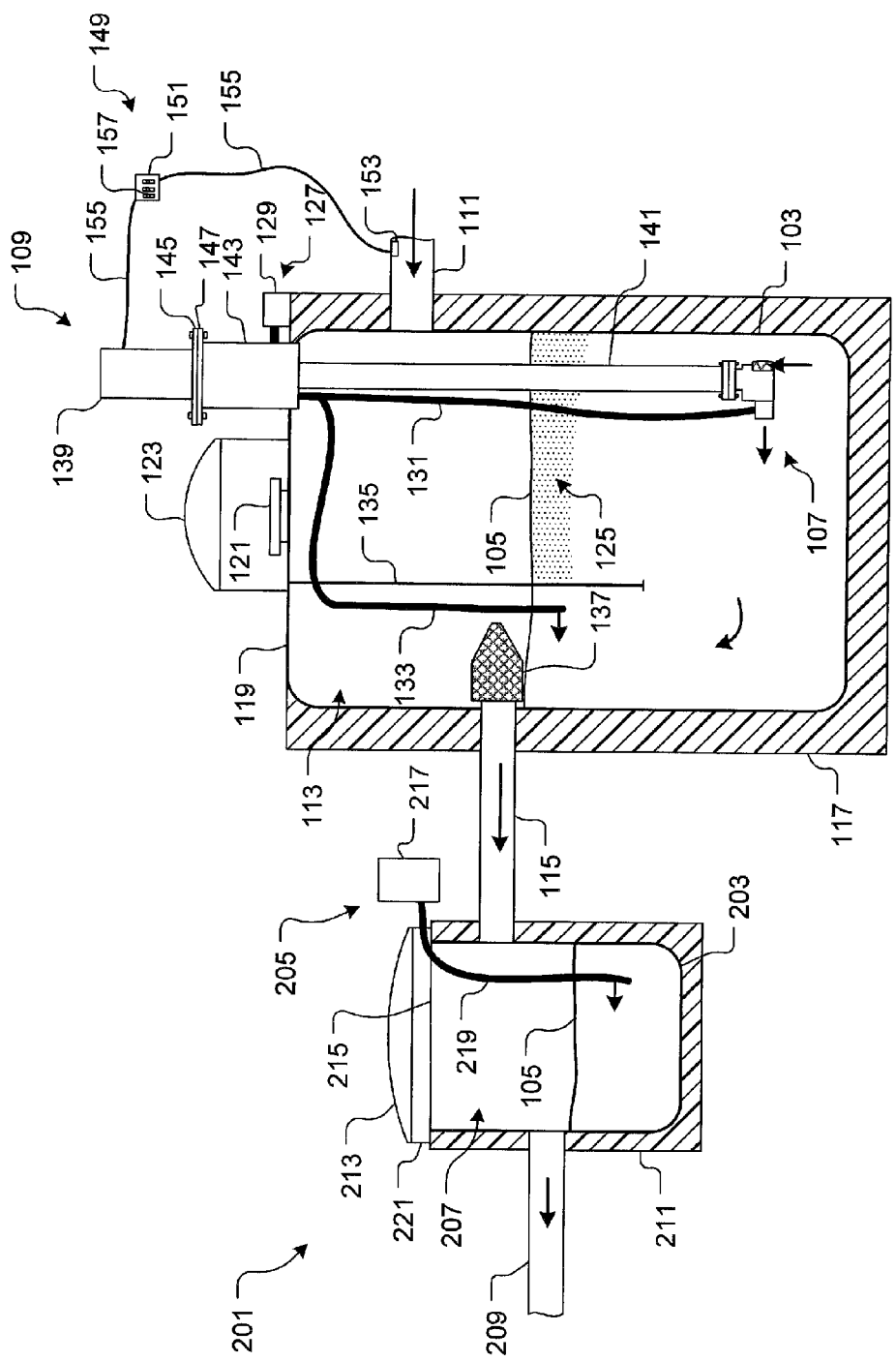
FIG. 2 is a side view of an alternative embodiment of the septic system of FIG. 1.

Referring now also to FIG. 2 in the drawings, an alternative embodiment of septic system 101 is illustrated. In this embodiment, septic system 101 is further provided with an additional septic system 201, which is adapted to further treat liquid waste 105 before the effluent is leached into an area surrounding the septic system. It should be appreciated that the features discussed above with respect to septic system 101 may be incorporated in septic system 201.

Septic system 201 comprises one or more of a tank 203 and an air subsystem 205. Treated liquid waste 105 leaving septic system 101 is channeled to an inner cavity 207. Therein, liquid waste 105 is stored and treated before exiting through a conduit 209. Like septic system 101, tank 203 is preferable positioned underground and supported with a concrete material 211. An optional sun bonnet 213 is provided to cover a top surface 215 of tank 203. Sun bonnet 213 is manufactured with a material that allows sunlight to pass therethrough.

Air subsystem 205 includes an air pump 217 and a conduit 219. Conduit 219 preferably passes through a wall 221 supporting sun bonnet 213. Conduit 219 is in communication with liquid waste 105. The added oxygen further excites the enzymes disposed in liquid waste 105, thereby decomposing any remaining waste material 125 channeled from septic system 101. It should be appreciated that conduit 219 could couple to pump 129, resulting in only one air pump utilized between the two septic systems. Furthermore, it should be appreciated that air pump 217 could be operably associated with control system 149, such that pump 217 is activated concurrently with aeration subsystem 107.

Figure 3:
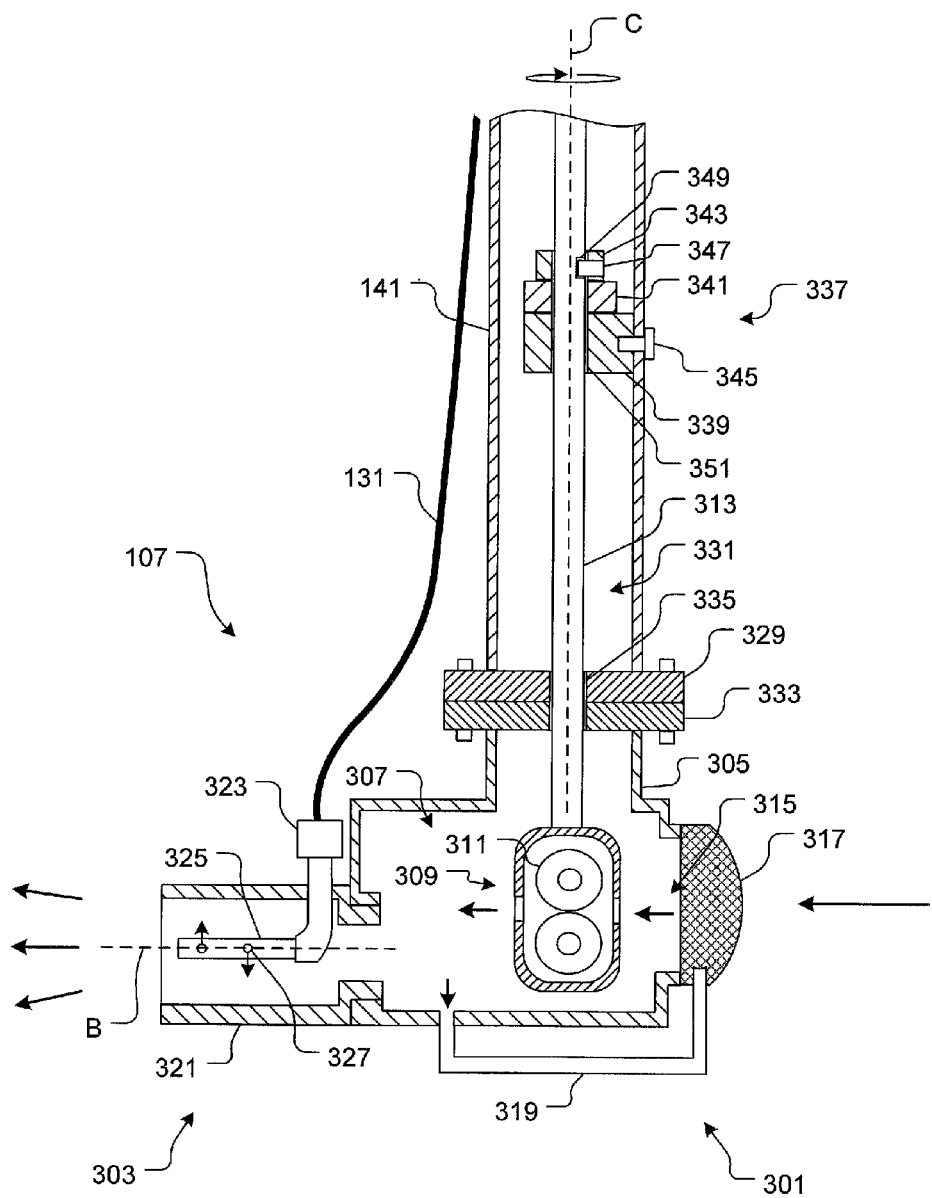
FIG. 3 is a side view of an aeration subsystem of the septic system of FIG. 1.

Referring now also to FIG. 3 in the drawings, a side view of aeration subsystem 107 is illustrated. Aeration subsystem 107 preferably includes a compressor section 301 and an injector section 303. In the preferred embodiment, injector section 303 is threadedly coupled to compressor section 301 (see FIG. 4); however, it should be appreciated that alternative embodiments could include different attachment means, i.e., a quick-release device, in lieu of the preferred embodiment. During operation, liquid waste 105 enters compressor section 301, where liquid waste 105 is compressed, and thereafter, channeled to injector section 303, where the compressed liquid waste 105 is injected with oxygen. The application of adding pressure and oxygen to the liquid waste 105 has been found to be effective in exciting the enzymes, resulting in a feeding frenzy, wherein the enzymes actively decompose waste material 125.

Compressor section 301 includes a casing 305 having an inner cavity 307 for housing a compressor 309. In the preferred embodiment, compressor 309 creates sufficient pressure to break apart the enzymes' molecular bonds. Compressor 309 preferably includes two or more intermeshing gears 311 driven by shaft 313 rotatably coupled to motor 139. It should be appreciated that alternative embodiments could include other devices, i.e, actuators, piston, impellers, and the like for compressing liquid waste 105. Alternative compressor sections could also be adapted with a compressor or similar device that merely directs liquid waste 105 from compressor section 301 to injector sector 303 without breaking apart the enzymes' molecular bonds.

Casing 305 includes an opening 315 that provides access for liquid waste 105 to enter cavity 307. In the preferred embodiment, opening 315 is covered with a screen 317 for preventing waste material 125 from entering into cavity 307. An optional conduit 319 channels compressed liquid waste 105 from cavity 307 to opening 315 for blowing clogged waste matter 125 off screen 317.

Injector section 303 is adapted for injecting oxygen in the compressed liquid waste 105 from compressor section 301. Injector section 303 preferably includes a conduit 321, a connector 323, and a nozzle 325. Connector 323 passes through conduit 321 and connects tubing 131 to nozzle 325. During operation, air from pump 129 channels through tubing 131, through connector 323, and is injected into liquid waste 105 via nozzle 325. Nozzle 325 is manufactured with one or more selectively positioned ports 327 for injecting air into the stream of liquid waste 105 passing through injector section 303. In the preferred embodiment, nozzle 325 is coaxially aligned with the longitudinal centerline B of conduit 321. Further illustration and discussion of injector section 303 is provided below with reference to FIGS. 4 and 5.

Aeration subsystem 107 is securely held within cavity 113 via mast 141. Mast 141 has an interior cavity 331, which houses shaft 313. Mast 141 includes a flange 329 adapted to securely fasten to a flange 333 attached to casing 305. When assembled, flange 329 is secured to flange 333 with one or more bolts. Flange 329 and flange 333 create a fluid seal such that liquid waste 105 from compressor section 301 does not escape into cavity 331. A channel 335 extends through flange 329 and flange 333 for allowing shaft 313 to snugly pass therethrough.

A bearing system 337 is utilized for retaining shaft 313 coaxially aligned with the longitudinal axis C of mast 141. Bearing system 337 is disposed within cavity 331 and comprises one or more of a support member 339, a load bearing 341, and a stop collar 343. Support 339 is rigidly fastened to the inner wall of mast 141 with a fastening means 345, i.e., a bolt the screws through mast 141 and partially through support 339. When assembled, load bearing 341 and collar 343 rests on support 339. Collar 343 is provided with an attachment means 347 for coupling with a hole 349 extending inwardly in shaft 313. A channel 351 extends through bearing system 337 for allowing shaft 313 to snugly pass therethrough.

Figure 4:
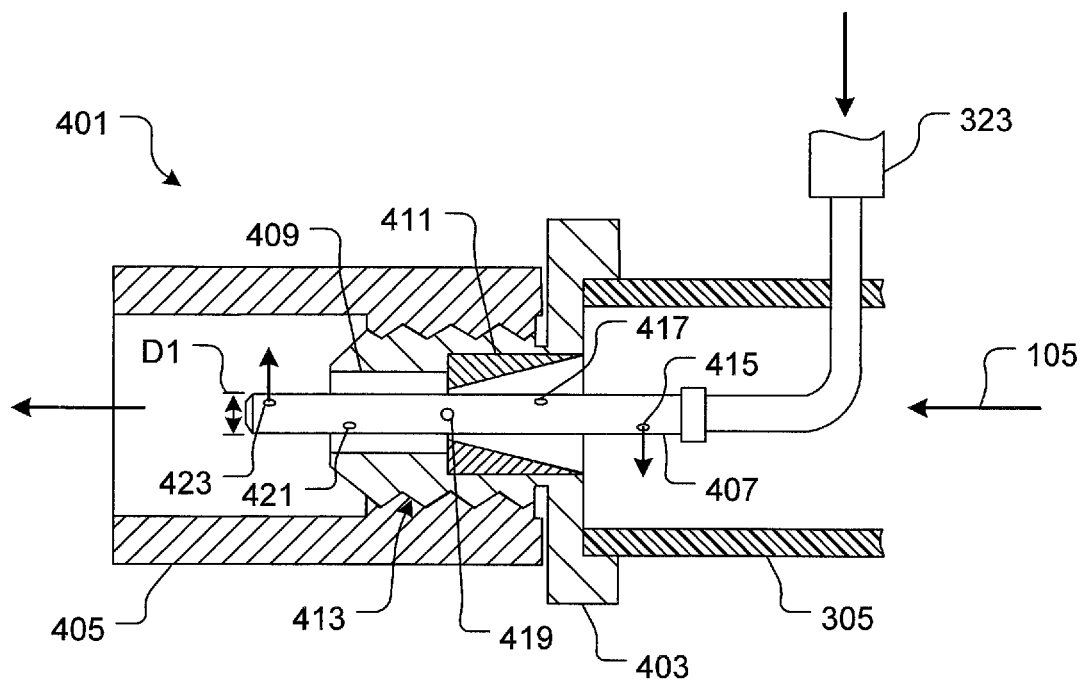
FIG. 4 is a side view of an injector section of the aeration subsystem of FIG. 3.

Referring now also to FIG. 4 in the drawings, a side view of an injector section 401 is illustrated. Injector section 401 is substantially similar in function to injector section 303, wherein injector section 401 couples to compressor section 301 and is adapted for injecting oxygen from air subsystem 127 into liquid waste 105. Injector section 401 preferably includes a member 403, a conduit 405, and a nozzle 407.

Member 403 is preferably welded to casing 305, thereby providing sufficient joining strength between the two components for resisting forces exerted by the pressurized liquid waste 105 exiting compressor section 301. However, it should be appreciated that alternative embodiments could include different attachment means for coupling member 403 to casing 305. For example, both member 403 and casing 305 could include threaded ends such that member 403 is able to screw on casing 305. Member 403 is preferably manufactured with a channel 409, an injection cone 411, and threaded ends 413.

Nozzle 407 preferably comprises five equally spaced ports: a port 415 located near the entrance of cone 411; a port 417 located within cone 411; a port 419 located at the exit 420 of cone 411; a port 421 located in channel 409; and a port 423 located in conduit 405. This configuration increases the efficiency of mixing oxygen with the enzymes. Liquid waste 105 is sped up, slowed down, expanded and contracted within injector section 401, thereby creating a turbulent flow of liquid waste 105 which is ideal for injecting and mixing oxygen with the enzymes. In the preferred embodiment, each port is oriented at an angle with respect to each other, preferably around 60 degrees offset from each other. Also, it is preferred that an additional port (not shown) is positioned directly opposite to port 419. Of course, it should be understood that different embodiments could include a nozzle having more or less ports, ports that do not align at different angles with respect to each other, and ports that are selectively positioned at different locations within injector section 401.

Figure 5:
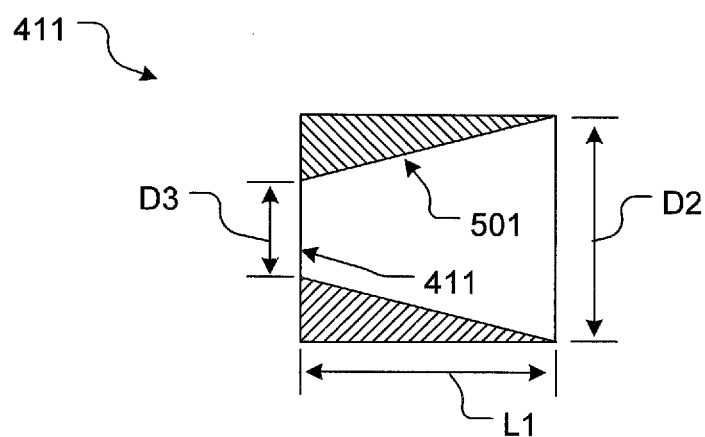
FIG. 5 is a side view of an injection cone of the injector section of FIG. 4.

Referring now also to FIG. 5 in the drawings, a side view of injection cone 411 is illustrated. Injection cone 411 increases the speed, pressure, and heat of liquid waste 105 leaving compressor section 301, thereby further exciting the enzymes. Injection cone 411 is preferably manufactured with a conical geometric shape, wherein cone 411 has a diameter D2 of approximately 0.98 inches at the entrance, a diameter D3 of approximately 5/8 inches at the exit, and a length L1 of approximately 5/8 inches.

In the preferred embodiment, injection cone 411 has a surface 501 that linearly tapers down from D2 to D3. However, it should be appreciated that alternative embodiments could include a surface 501 having various surface profiles, including convex, concave, elliptical, and the like in lieu of the preferred embodiment.

Figure 6:
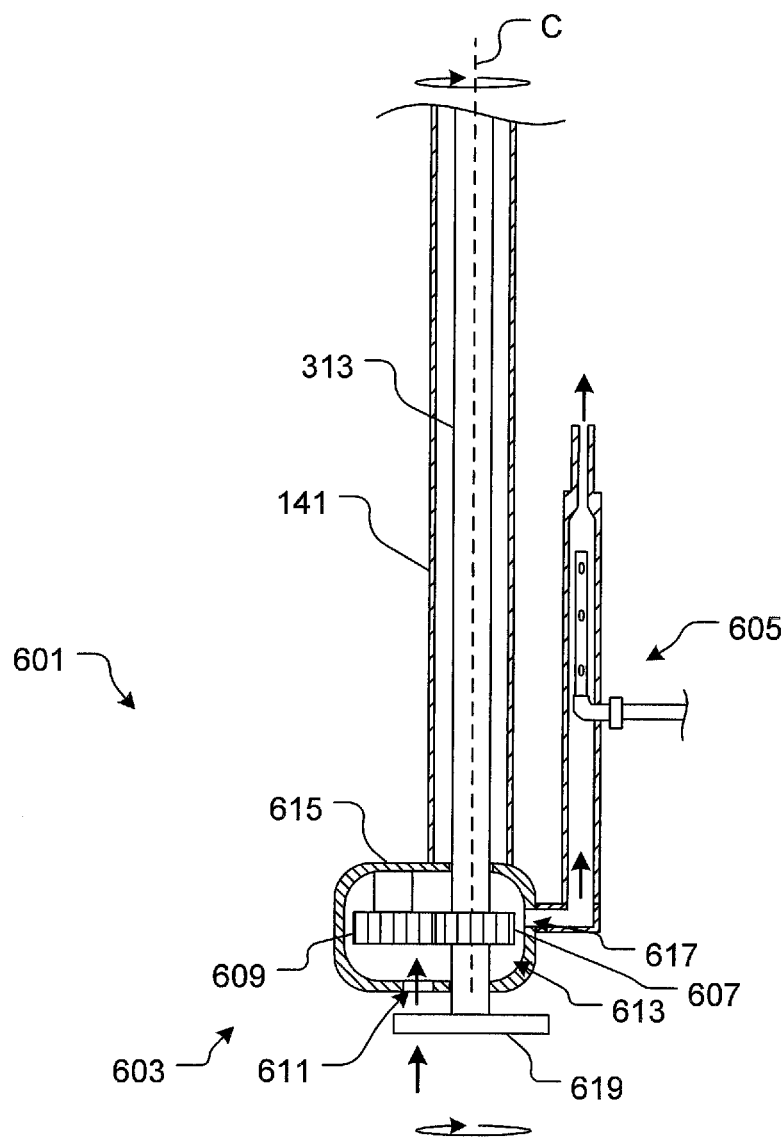
FIG. 6 is a side view of an alternative embodiment of the aeration subsystem of the septic system of FIG. 1.

Referring now also to FIG. 6 in the drawings, a side cross-sectional view of an alternative embodiment of the aeration subsystem is shown. Aeration subsystem 601 is substantially similar in function to aeration subsystem 107 described above and illustrated in FIGS. 1-5. It should be appreciated that the features of aeration subsystem 601 could easily be incorporated in the septic systems described above, and likewise, the features of the septic systems described above could be incorporated in aeration subsystem 601.

Aeration subsystem 601 comprises one or more of a compressor section 603 and an injector section 605, both being substantially similar in function to compressor section 301 and injector section 303, respectively. In particular, compressor section 603 is adapted to compress liquid waste 105 passing therethrough, while injector section 303 is adapted to injected oxygen into the compressed liquid waste 105.

Compressor section 603 comprises one or more intermeshing gears 607 and 609 adapted to compresses liquid waste 105 and the enzymes disposed therein. In the preferred embodiment, gears 607 and 609 causes sufficient pressure to break apart the molecular structure of the enzymes. Gears 607 and 609 creates a negative pressure, which in turn causes liquid waste 105 to channel through a first port 611 and enter a cavity 613 of housing 615. Thereafter, the compressed liquid waste 105 is channeled through a second port 617 of housing 615 and injected with oxygen via injector subsystem 605.

Shaft 313 is utilized to drive compressor section 603 and a rotating blade 619. It should be appreciated that aeration subsystem 601 could be adapted with an optional transmission (not shown) adapted to vary the rotational speeds of the gears and the blade. Blade 619 effectively chops and shreds liquid waste 105 passing through port 611. In the preferred embodiment, blade 619 is a single straight strip of metal having relatively no contouring. However, it will be appreciated that alternative blade embodiments could include multiple strips of material, either metal or other suitable materials, with or without contouring. In the exemplary embodiment, blade 619 extends over the entire entrance of port 611; however, alternative embodiments could be blades that extend partially over the entrance of port 611.

Figure 7:
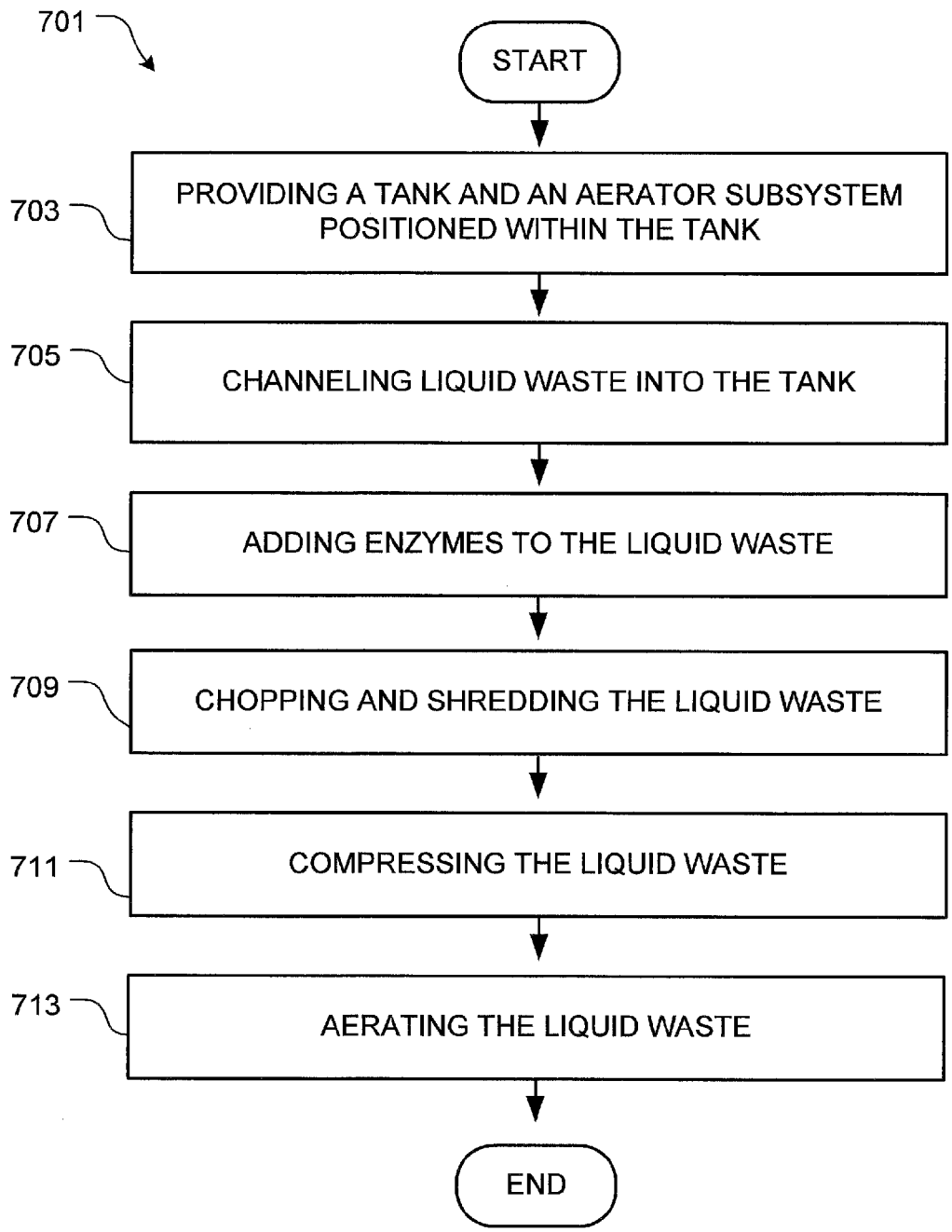
FIG. 7 is a flow chart illustrating the method of diagnosis according to preferred embodiment.

Referring now also to FIG. 7 in the drawings, a flow chart 701 illustrating the preferred method of the present application is shown. Box 703 depicts the first step, which includes the process of providing a tank and an aeration subsystem positioned therein. Liquid waste enters the tank as depicted in box 705. Thereafter, enzymes are added to the liquid waste as depicted in box 707. The liquid waste is chopped with a blade as depicted in box 709. Finally, the liquid waste is compressed and aerated as depicted in boxes 711 and 713.

Figure 8:
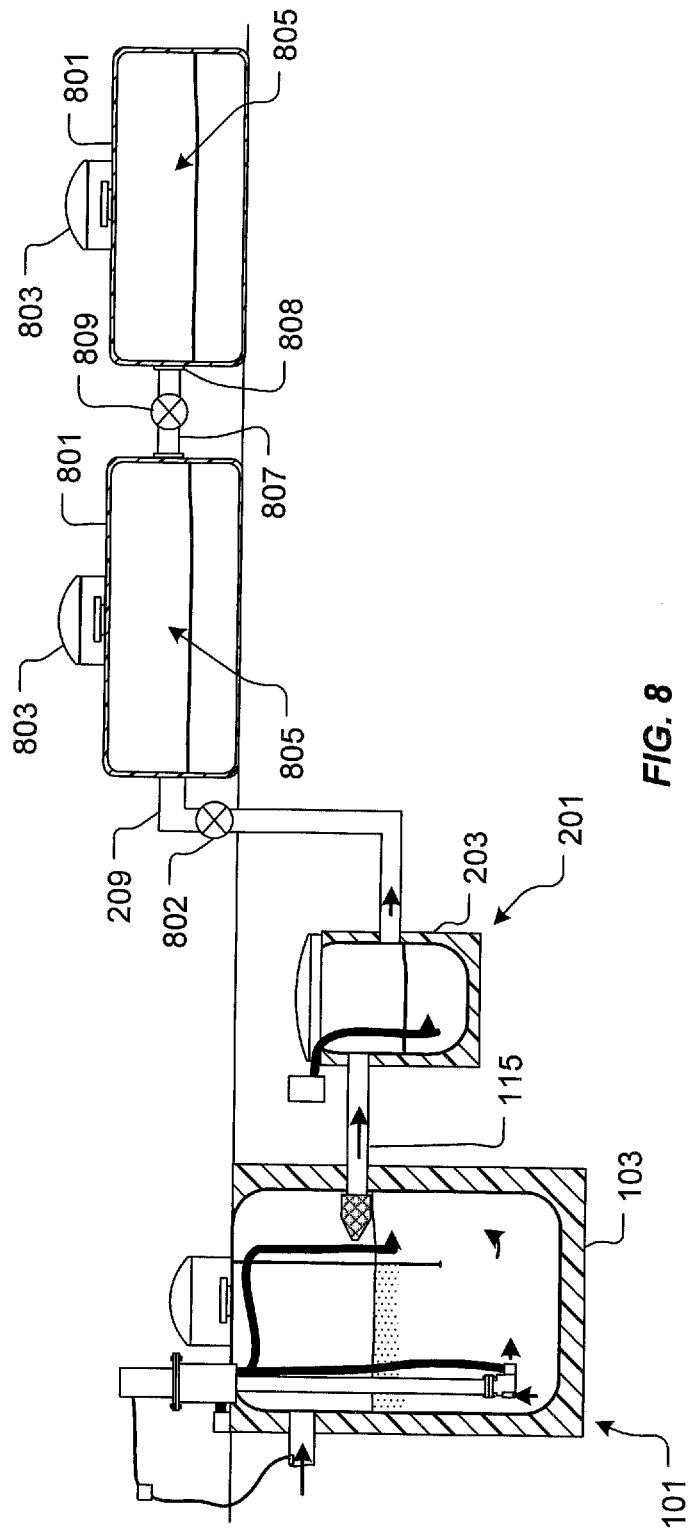
FIG. 8 is a side view of an alternate embodiment of the septic system of FIG. 1.

Referring now also to FIG. 8 in the drawings, an alternative embodiment of septic system 101 is illustrated. In this embodiment, septic system 800 includes septic systems 101 and 201 in communication with a storage tank 801. It is appreciated that alternate embodiments of septic system 800 may remove septic system 101 or 201. Storage tank 801 is adapted to store waste water exiting tank 103 through conduit 115 and/or tank 203 through conduit 209 within an interior cavity 805. Storage tank 801 is configured to be in fluid communication with the waste material. It should be appreciated that the features described above with regards to septic systems 101 and 201 could be incorporated into septic system 800, and more particularly to storage tank 801. For example, storage tank 801 may be configured to accept and operate in conjunction with one or more of the subsystems used with septic systems 101 and 201 for controlling, oxygenating, and treating the waste water.

One or more storage tank 801 may be used. Where pluralities of storage tanks 801 are used, storage tanks 801 are coupled together with a tank conduit 807. Tank conduit 807 is coupled to storage tanks 801 at a port (not shown) located in a side of storage tank 801. A connector 808, such as a quick release connector, is used to seal tank conduit 807 to storage tank 801. Tank conduit 807 is in fluid communication with the waste material and permits waste material to move between storage tanks. Some embodiments may incorporate a valve 809 coupled to tank conduit 807. Valve 809 is in fluid communication with the waste material and is configured to restrict the movement of the waste material between storage tanks 801.

Storage tank 801 is configured to rest above ground level and is preferably manufactured having a plurality of sides with an impermeable material, i.e., plastic, that allows sunlight or other forms of light to travel therethrough and further increase the effectiveness of the treatment process due to sunlight exciting the enzymes, which in turn causes the enzymes to effectively further decompose the waste material. Of course, it should be appreciated that alternative embodiments could include storage tank 801 having different storage capacities and composed of different materials in lieu of the currently described embodiment as with previously described tanks 103 and 203. For example, in alternate embodiments, storage tanks 801 may be sized and configured to be portable.

Due to locating storage tank 801 above ground, it is understood that additional driver subsystems may be used to move the waste water from tanks 103 and 203 to storage tank 801. For example, a pump 802 may be coupled to conduit 115 between tank 103 and storage tank 801 and/or conduit 209 between tank 203 and storage tank 801. Pump 802 is in fluid communication with the waste material and is configured to channel the waste material to storage tank 801.

Additionally, the ornamental and aesthetic appearance of storage tank 801 may be modified and configured to disguise the appearance of storage tank 801. For example, storage tank 801 may be used as a fence surrounding the perimeter of a building. It is appreciated that storage tanks 801 may include any number of lids 803 or bonnets positioned on a top side of storage tank 801 to permit access to the interior cavity 805 of storage tanks 801.

Figure 9:
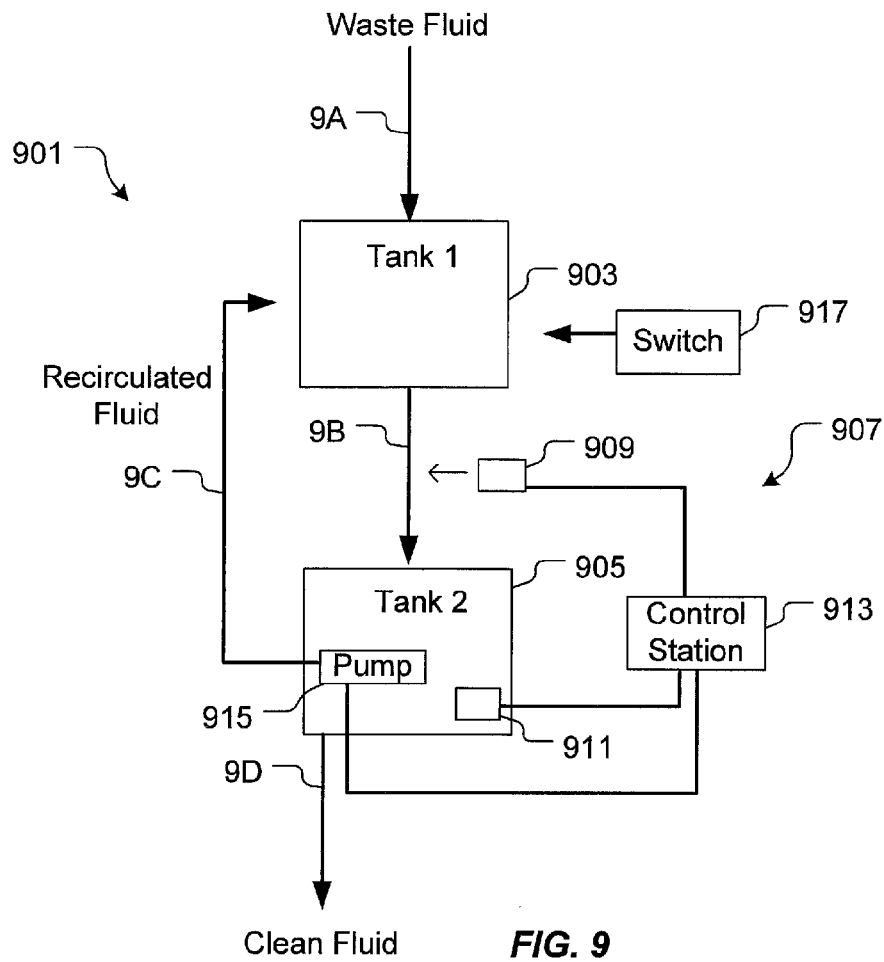
FIG. 9 is a simple schematic of a septic system according to an alternative embodiment of the present application.

FIG. 9 is a simplified schematic of a septic system 901. System 901 is substantially similar in form and function to the one or more of the septic systems discussed herein. It should be understood that although not shown in FIG. 9, the features one or more of the system discussed herein are hereby incorporated, and vice-versa, within system 901.

In the contemplated embodiment, system 901 is configured to recirculate waste material between two or more tanks until a desired cleanliness of the fluid is reached. To achieve this feature, system 901 recirculates the waste material between a first tank 903 in fluid communication with a second tank 905. A recirculation system 907 includes one or more of a first sensor 909 positioned outside of the second tank 905 and a second sensor 911 disposed within tank 905. The sensors 909, 911 are in data communication with a control station 913. During use, the sensors 909, 911 determine the cleanliness of the waste fluid and relay the sensed data to the control station 913, which in turn commands a pump 915 carried within tank 905 to recirculate the waste fluid if a desired cleanliness is not reached. In the preferred embodiment, sensor 909 is a light beam that detects the particulate matter within the waste fluid. However, alternative embodiments could utilize other sensors either directly exposed or outside the stream of the fluid waste material.

System 901 is further provided with a switch 917 configured to activate system 901 during use. For example, in lieu of constantly running system 901, the system can be either manually or autonomously activated. This feature greatly reduces costs associated with the continuous use of system 901.

During use, fluid waste material enters first tank 903, as indicated by arrow 9A, which in turn is treated with one or more of the processes discussed herein for treating the waste material. The treated fluid waste is thereafter channeled to second tank 905, where the treated fluid waste is further treatment and/or stored, as indicated by arrow 9B. If a desired cleanliness of the waste fluid is not achieved, the waste fluid is recirculated to tank 903 via pump 915, as indicated the arrow 9C. When a desired cleanliness is achieved, the clean fluid is channeled from tank 905, as indicated by arrow 9C.

Figure 10:
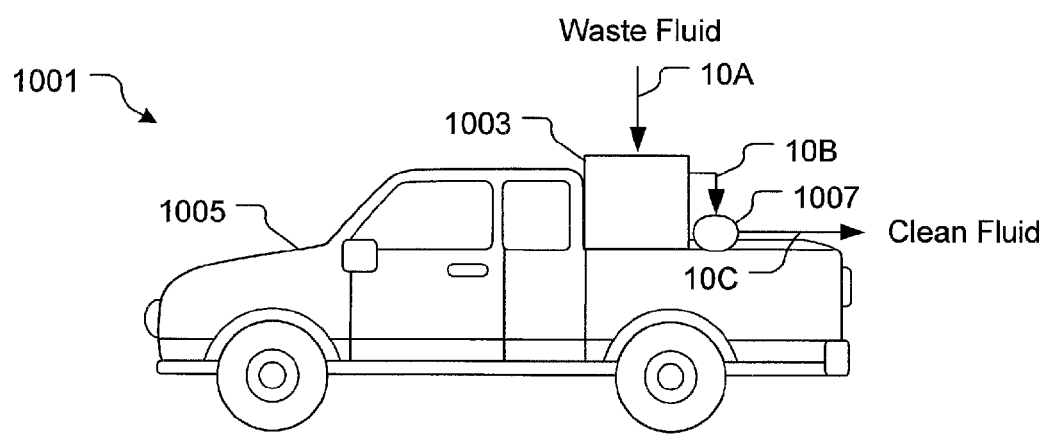
FIG. 10 is a side view of a treatment system according to an alternative embodiment.

FIG. 10 is a side view of a treatment system 1001 that carries a septic system 1003. System 1003 is substantially similar in function to the one or more of the septic systems discussed herein. It should be understood that although not shown in FIG. 10, the features one or more of the system discussed herein are hereby incorporated, and vice-versa, within system 1003.

In the contemplated embodiment, system 1001 is mobile and configured to collect the waste material, treat the waste material, travel to a designated area, and dispose of the treated waste material at the designated area. To achieve this feature, system 1001 includes one or more of a vehicle 1005 configured to carry system 1003 and a pump 1007.

During use, the waste fluid enters system 1003, as indicated by arrow 10A, is treated, and is pumped from system 1003 via pump 1007, as indicate by arrows 10B and 10C.

System 1001 provides significant advantages, namely, having a mobile treatment system allows the user to collect waste material from multiple locations, residential homes, farms, and so forth, and transport the waste material to a desired location while simultaneously treating the material.

Figure 11:
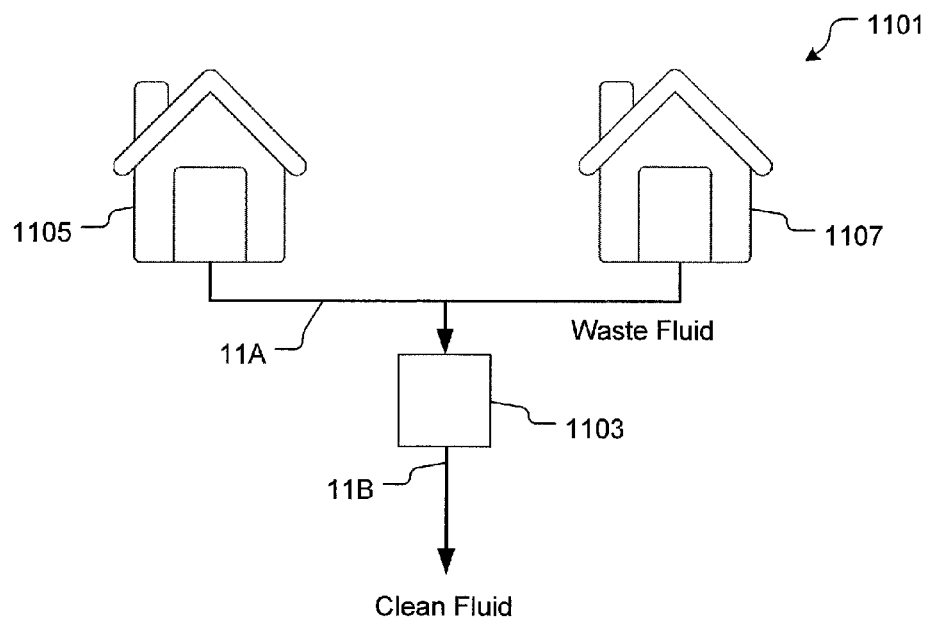
FIG. 11 is a simple schematic of a treatment system according to an alternative embodiment of the present application.

FIG. 11 illustrates a simplified schematic of a treatment system 1101 having a septic system 1103 according to an alternative embodiment of the present application. System 1103 is substantially similar in function to one or more of the systems discussed herein. It should be understood that although not shown in FIG. 11, the features one or more of the system discussed herein are hereby incorporated, and vice-versa, within system 1103.

Treatment system 1101 is utilized with two or more fluid sources, which in the contemplated embodiment, is a first residence 1105 and a second residence 1107. during use, the fluid waste material is channeled to system 1103, as indicated by arrow 11A. After the waste material is treated, the clean fluid is disposed of, as indicated by arrow 11B.

System 1101 provides significant advantages, specifically, system 1101 allows for multiple fluid waste sources to channel the waste material to a common septic system for treatment. This feature greatly reduces the costs associated with establishing multiple system for each residential source.

Although shown associated with residential units in FIG. 11, it will be appreciated that system 1101 could be utilized with other types of buildings, structure, and/or locations, e.g., a farm.

Figure 12:
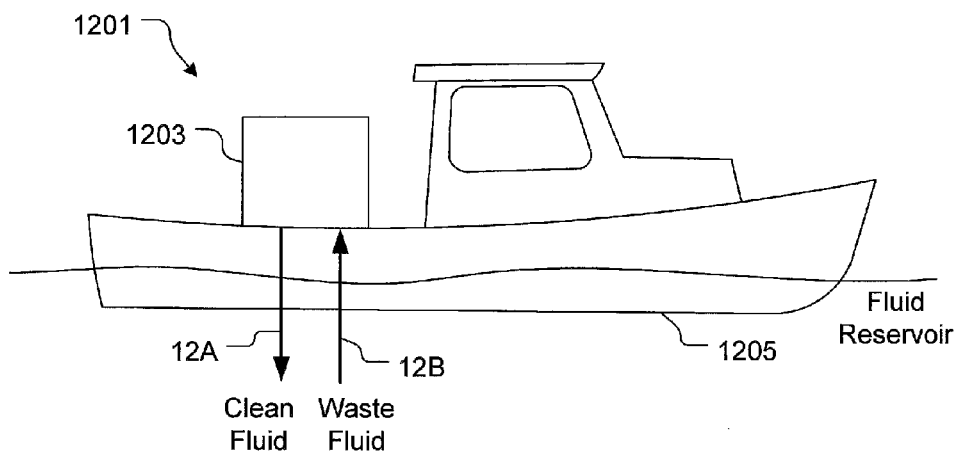
FIG. 12 is a side view of a treatment system according to an alternative embodiment.

FIG. 12 is a side view of a treatment system 1201 having a septic system 1203 in accordance with an alternative embodiment of the present application. System 1203 is substantially similar in function to the one or more of the systems discussed herein. It should be understood that although not shown in FIG. 12, the features one or more of the system discussed herein are hereby incorporated, and vice-versa, within system 1203.

In the contemplated embodiment, system 1201 is mobile and configured to collect the waste material, treat the waste material, and dispose of the treated waste material. In this embodiment, the septic system 1203 is carried on a boat 1205. As depicted, waste fluid from a reservoir enters system 1203, as indicated by arrow 12A, and is thereafter disposed back into the reservoir, as indicated by arrow 12B.

In the preferred embodiment, the clean fluid is returned back to the fluid reservoir; however, it will be appreciated that the clean fluid can be channeled to locations outside the reservoir in alternative embodiments.

In all the embodiments discussed herein, the systems are operably associated with septic waste material; however, it will be appreciate that one or more of the systems and methods discussed herein can also be utilized with different types of waste materials, e.g., grease from a grease trap, biohazard material, animal waste material, and the like.

It is apparent that a system and method with significant advantages has been described and illustrated. The particular embodiments disclosed above are illustrative only, as the embodiments may be modified and practiced in different but equivalent manners apparent to those skilled in the art having the benefit of the teachings herein. It is therefore evident that the particular embodiments disclosed above may be altered or modified, and all such variations are considered within the scope and spirit of the application. Accordingly, the protection sought herein is as set forth in the description. Although the present embodiments are shown above, they are not limited to just these embodiments, but are amenable to various changes and modifications without departing from the spirit thereof.

What is claimed is:

1. A treatment system for fluid waste material, the system comprising:
   a mobile vehicle;
   a first tank carried by the vehicle and configured to store fluid waste material;
   a second tank in fluid communication with the first tank;
   a recirculation system in fluid communication with the first tank and the second tank and configured to recirculate fluid from the first tank to the second tank, the recirculation system, having:
      a control station;
      a first sensor; and
      a pump;
      wherein the sensor is configured to sense whether the fluid waste material is at a desired cleanliness, and if not, the control station is configured to activate the pump, which in turn recirculates that waste fluid from the first tank to the second tank;
   an aeration subsystem in fluid communication with the fluid waste material; and
   a compressor in fluid communication with the fluid waste material;
   wherein the aeration subsystem is configured to mix air with the fluid waste material; and
   wherein the compressor is configured to compress the fluid waste material.

2. The treatment system of claim 1, wherein the first sensor is a light beam that emits light through the waste material passing from the first tank to the second tank.

3. The treatment system of claim 1, wherein the mobile vehicle is a truck.

4. The treatment system of claim 1, wherein the mobile vehicle is a boat.

5. The treatment system of claim 1, wherein the compressor is disposed within the first tank.

* * * * *